United States Patent [19]

Inoue et al.

[11] Patent Number: 4,626,900
[45] Date of Patent: Dec. 2, 1986

[54] COLOR VIDEO SIGNAL REPRODUCING CIRCUIT FOR INDEX TYPE TELEVISION UTILIZING VERTICAL CORRELATION OF INDEX SIGNALS AND 360° PHASE DETECTION AND ADJUSTMENT CIRCUITS

[75] Inventors: Fumio Inoue; Hiroshi Jitsukata, both of Yokohama, Japan

[73] Assignee: Hitachi, Ltd., Tokyo, Japan

[21] Appl. No.: 563,035

[22] Filed: Dec. 19, 1983

[30] Foreign Application Priority Data

Feb. 25, 1983 [JP] Japan .................................. 58-29301

[51] Int. Cl.⁴ .......................... H04N 9/24; H01J 29/41
[52] U.S. Cl. ........................................ 358/67; 358/69; 315/12.1
[58] Field of Search ........................ 358/67, 69, 70, 66; 315/12.1

[56] References Cited

U.S. PATENT DOCUMENTS

| | | | |
|---|---|---|---|
| 3,328,516 | 6/1967 | Usami et al. | 358/70 |
| 3,691,475 | 9/1972 | Mouri et al. | 358/25 |
| 3,786,179 | 1/1974 | Mouri et al. | 358/25 |
| 4,183,053 | 1/1980 | Tomii et al. | 358/67 |
| 4,408,223 | 10/1983 | Midland | 358/67 |

FOREIGN PATENT DOCUMENTS

| | | | |
|---|---|---|---|
| 43888 | 4/1981 | Japan | 358/67 |
| 149883 | 11/1981 | Japan | 358/67 |
| 44387 | 3/1982 | Japan | 358/67 |

OTHER PUBLICATIONS

Macwhirter, Ian, "Beam Indexing Tubes", Wireless World, Feb. 1961. pp. 92-98.

Primary Examiner—James J. Groody
Assistant Examiner—Randall S. Svihla
Attorney, Agent, or Firm—Antonelli, Terry & Wands

[57] ABSTRACT

A color video signal reproducing circuit for an index type television including a phase detector and a phase adjusting circuit in which the phase detector detects the phase difference between an index signal of a present time and an index signal which is one horizontal scanning period prior to the present time in a range within 360° of phase, the phase detector then outputs a phase control signal which is indicative of the phase difference, and a phase adjustment circuit receives the present index signal and changes the phase of the input index signal corresponding to the phase control signal of the phase detector so as to output a new index signal for driving the index type television. The phase of the new index signal is corrected so as to comply with the color video signal having a different horizontal scanning frequency.

3 Claims, 8 Drawing Figures

COLOR VIDEO SIGNAL REPRODUCING CIRCUIT FOR INDEX TYPE TELEVISION UTILIZING VERTICAL CORRELATION OF INDEX SIGNALS AND 360° PHASE DETECTION AND ADJUSTMENT CIRCUITS

This invention relates to a color picture reproducing apparatus of index type, and more particularly to an apparatus of the type above described in which means are provided to deal with an appearance of an abnormal hue in a color picture reproduced from a color picture signal by a video tape recorder (VTR) in the still playback stop motion mode or in the variable-speed playback mode for visual search at, for example, a triple speed.

The principle of index type color picture reproduction is already commonly known in the art and, therefore, it will be only briefly explained herein. This index type color picture reproduction differs from the conventional shadow mask type one and is featured by the fact that a single electron beam is used to reproduce a color picture. For this purpose, the phosphor screen of the picture tube includes the combination of stripes of red, green and blue phosphors arrayed in a relation orthogonal with respect to the scanning direction of the electron beam and index phosphor stripes arrayed in a fixed relation with the tri-color phosphor stripes. An index signal obtained from light emitted from the index phosphor stripes as a result of sequential scanning with the electron beam is utilized to detect the scanning position of the electron beam, and, on the basis of the detected position information, the electron beam in a desired quantity is generated during scanning of the desired tri-color phosphors so as to reproduce a proper color picture.

As will be readily understood from consideration of a status of reproduction of a specific color, the signal frequency $f_T$ driving the index type color picture tube is determined by $f_T = m/t$, where m is the number of the color phosphor trios (red, green and blue) disposed on the phosphor screen, and t is the length of time required for one scanning on the phosphor screen. In order that the hue corresponding to the phase of a received chrominance signal can always be accurately reproduced, the phase of the tube drive signal of the frequency $f_T$ must be changed according to the phase of the chrominance signal. That is, in an index type color picture reproducing apparatus, a chrominance signal having a frequency $(f_{sc} \pm \Delta f)$ or $(3.58 \pm 0.5$ MHz in the NTSC system) is received, and it is necessary to make frequency conversion of the signal of the frequency $f_{sc}$ into the signal of the frequency $f_T$ while unchanging the amplitude and phase information included in the chrominance signal. More concretely, the index signal of the frequency $f_T$ derived from the index phosphor stripes is multiplied in an index signal processing circuit by the chrominance subcarrier of the frequency $f_{sc}$, and, after extraction of one of the resultant signals of the frequencies $(f_T \pm f_{sc})$, for example, the signal of the frequency $(f_T + f_{sc})$, that signal is multiplied by the chrominance signal of the frequency $(f_{sc} \pm \Delta f)$ to obtain signals of the frequency $(f_T + 2f_{sc} \pm \Delta f)$ and $(f_T \mp \Delta f)$. The signal of the frequency $(f_T \mp \Delta f)$ in the above signal is suitable for driving the index type color picture tube.

It will thus be seen that the step of frequency conversion is required for the reproduction of a color picture in the index type color picture reproducing apparatus, and, for the purpose of this frequency conversion, it is required to use a band-pass filter having a considerably narrow pass bandwidth. Such a band-pass filter operates with a signal delay time $\Delta \tau$. In the practical circuit structure, this delay time $\Delta \tau$ is of the order of several $\mu$sec. When the index signal processing circuit operates with the signal delay time $\Delta \tau$, the index signal derived from the index phosphor stripes drives the color picture tube with the fixed delay time $\Delta \tau$. Under such a situation, the distance between the position of generation of the index signal on the phosphor screen and that of the electron beam emitted in the color picture tube driven by the index signal will remain unchanged throughout the phosphor screen in an ideal condition where the horizontal deflection is free from any linear distortion. However, when the horizontal deflection is subject to a linear distortion, the above distance will not be uniform throughout the phosphor screen. That is, the relation between the arrangement of the tri-color phosphor stripes and the phase of the tube drive signal is not uniform throughout the phosphor screen, and, consequently, the hue of a reproduced color picture will differ depending on the position on the phosphor screen even when a chrominance signal of the same hue is received. In other words, there arises the problem that hue of the reproduced picture becomes nonuniform all over the screen.

Such a problem does not arise when the horizontal deflection is free from any linear distortion as described above. However, an attempt to limit hue error of a reproduced color picture to less than 5° which is commonly considered to be an allowable limit results in an extremely severe specification for dealing with the linear distortion of the horizontal deflection, and such an attempt is difficult to be put into practice when the temperature characteristics of the circuit elements, etc. are also taken into account. (The required specification for dealing with the linear distortion of the horizontal deflection is dependent upon the number of the red, green and blue phosphor trios in the phosphor stripes coated on the phosphor screen and the delay time $\Delta \tau$ of the index signal processing circuit, and an improvement in the performance by about $10^2$ is generally required as compared with the specification required for a conventional shadow mask type color television receiver.)

Therefore, the index type color picture reproducing apparatus generally uses a delay line providing a delay time corresponding to one horizontal period. This delay line provides a delay time of $(1H - \Delta \tau)$, where 1H represents one horizontal period of 63.556 $\mu$sec in the NTSC system, and $\Delta \tau$ represents the delay time of several $\mu$sec in the index signal processing circuit. As a result, the extracted index signal drives the color picture tube with a delay time exactly equal to one horizontal period of 63.556 $\mu$sec. Since the adjacent horizontal scanning lines have a sufficient correlation therebetween in respect of the horizontal linear distortion, driving of the color picture tube by the extracted index signal with the delay time of 1H is equivalent to driving of the color picture tube without any delay time, so that the adverse effect of the horizontal linear distortion can be eliminated.

On the other hand, a problem which will be described below arises when the index type color picture reproducing apparatus using the 1H delay line above described is used as an electronic view finder for a video camera or as a monitor display for monitoring a color picture reproduced by a VTR.

The problem is that, although a color picture having a normal hue can be reproduced when such a monitor display is used to monitor the picture picked up by the video camera or used to reproduce the picture recorded by the VTR at a standard playback speed, the hue of the reproduced picture tends to differ from the normal one in the still playback stop motion mode or in the variable-speed playback mode for visual search at, for example, a playback speed three or ten times as high as the standard or normal speed.

This is attributable to the use of the 1H delay line in the index type color picture reproducing apparatus for the aforementioned reasons and attributable also to the recording and reproducing method itself used in a VTR for recording and reproducing color pictures on and from a magnetic tape. This recording and reproducing method used in a VTR will now be briefly explained with reference to FIG. 1. FIG. 1 illustrates how a picture signal is recorded on a video tape, by way of example. In FIG. 1, the numerals 1 to 525 indicate the recorded locations of picture signal portions each of which corresponds to one horizontal period. It will be readily understood from FIG. 1 that picture signal portions corresponding to 262.5 horizontal periods corresponding to an odd field are recorded on the video track of the channel $CH_1$, and remaining picture signal portions corresponding also to 262.5 horizontal periods corresponding to an even field are recorded on the video track of the channel $CH_2$. The signal portions recorded on the two video tracks of the channels $CH_1$ and $CH_2$ provide the picture signal corresponding to one frame.

In the normal playback mode, in which the picture information recorded in the manner shown in FIG. 1. is reproduced at the standard speed, the reproducing heads accurately trace the video tracks of the channels $CH_1$ and $CH_2$ respectively according to the recorded order, and, therefore, the picture signal portions corresponding to the 525 horizontal periods are included in one frame of the reproduced signal. However, in the still playback mode or in the variable-speed playback mode such as the triple-speed playback mode, the reproducing heads obliquely trace the video tracks shown in FIG. 1, and the traces of the reproducing heads straddle or move across some of the different video tracks. Therefore, the number of the horizontal scanning lines traced in one frame period by the reproducing heads in the variable-speed playback mode is different from that traced by the reproducing heads in the normal playback mode in which the magnetic tape is driven for reproduction at the same standard speed as that in the recording mode. The difference in the number of the horizontal scanning lines is dependent upon the number of horizontal alignments $\alpha H$ and the multiple speed. (Although FIG. 1 illustrates that $\alpha_H = 1.5$, this value will naturally differ depending on the VTR type and the idea of design.)

When the number of the horizontal scanning lines traced in one frame period in the still playback mode or variable-speed playback mode differs from 525 which is the standard in the NTSC system, the signal reproduced by the VTR affects the horizontal scanning frequency or vertical scanning frequency, and either the horizontal scanning frequency or the vertical scanning frequency deviates from the standard frequency of the NTSC system. From the viewpoint of the reproducing mechanism of the VTR, the structure of the VTR can be more simplified when the horizontal frequency is shifted from the standard one while fixing the vertical frequency than when the vertical frequency is shifted from the standard one while fixing the horizontal frequency. In the case of the variable-speed playback mode, for example, the double-speed playback mode, it is only necessary to double the traveling speed of the magnetic tape when the vertical frequency is fixed. However, an attempt to control the vertical frequency requires the control of the rotation speed of the cylinder in addition to the control of the tape traveling speed. It is therefore a common practice that the horizontal frequency of the signal reproduced by the VTR in the variable-speed playback mode is shifted from the standard frequency of that used in the recording mode. On the other hand, when the horizontal frequency deviates greatly from the standard frequency as when, for example, the playback speed in the variable-speed playback mode is ten times as high as the standard playback speed, the synchronization of the horizontal scanning of the reproducing system of, for example, a television receiver becomes difficult. In such a case, the rotation speed of the cylinder is frequently controlled to attain matching of the horizontal frequency. However, even when the cylinder rotation speed is so controlled, some phase error remains, and it is extremely difficult to completely match the horizontal frequency with the standard frequency.

Therefore, the horizontal frequency in the signal reproduced by the VTR in the still playback mode and variable-speed playback mode except the standard-speed playback mode deviates generally from the standard frequency of that in the NTSC system.

On the other hand, the fixed delay line for delaying the index signal by one horizontal period (63.556 $\mu$sec) is employed in the index type color picture reproducing apparatus for the aforementioned reasons. Therefore, when the signal, which is reproduced by the VTR in the variable-speed playback mode and in which the horizontal frequency deviates from the standard frequency, is reproduced by the index type color picture reproducing apparatus, there arises the problem of incapability of accurate reproduction of the normal hue.

As a means for dealing with the above problem, the inventors made a proposal in Japanese Patent Application No. 57-226801 filed on Dec. 27, 1982. According to this proposal, the number of horizontal synchronizing signals or horizontal flyback pulses included in one frame period of a color picture signal applied to an index type color picture reproducing apparatus is counted to discriminate whether or not the input signal is the standard one of the NTSC system, and, after conversion of the result of discrimination into a corresponding DC voltage, the color saturation of the reproduced picture is controlled on the basis of the DC voltage.

That is, the proposal is such that a color picture is reproduced when a color picture signal meeting the standard of the NTSC system is received by the VTR and normal reproduction of colors can be expected, while, on the other hand, the color saturation of the reproduced picture is limited to reproduce a black-and-white picture only when a picture signal not meeting the standard of the NTSC system, such as that in the variable-speed playback mode of the VTR, is received and normal reproduction of colors cannot be expected.

However, it is apparent that the above proposal is defective in that a color picture reproducing apparatus so named can only reproduce a black-and-white picture although the reproduction of such a picture is limited to a specific case. It is proposed that the reproducing apparatus can reproduce a normal color picture under whatever conditions.

With a view to obviate the prior art defect pointed out above, it is a primary object of the present invention to provide a novel and improved color picture reproducing apparatus of the index type in which means are provided so that a normal color picture can be reliably reproduced even when the apparatus receives a picture signal not meeting the standard of the NTSC system.

The present invention which attains the above object provides that the vertical correlation between the index signal related to one of the scanning lines and that to the adjacent scanning line is utilized to detect the phase difference between the index signals, and the phase of the former index signal is shifted by the amount corresponding to the detected phase difference, thereby so controlling the phase of the index signal as to be capable of reproduction of a normal color picture, and using the so controlled index signal for the reproduction of the normal color picture. The apparatus according to the present invention includes a 360° phase detection circuit detectable the phase over a phase angle range of 360° and a 360° phase adjustment circuit adjustable the phase over a phase angle range of 360°, for the purposes of phase detection and phase control respectively of the index signal.

The present invention will be apparent from the following detailed description taken in conjunction with the accompanying drawings, in which.

Figure 1:
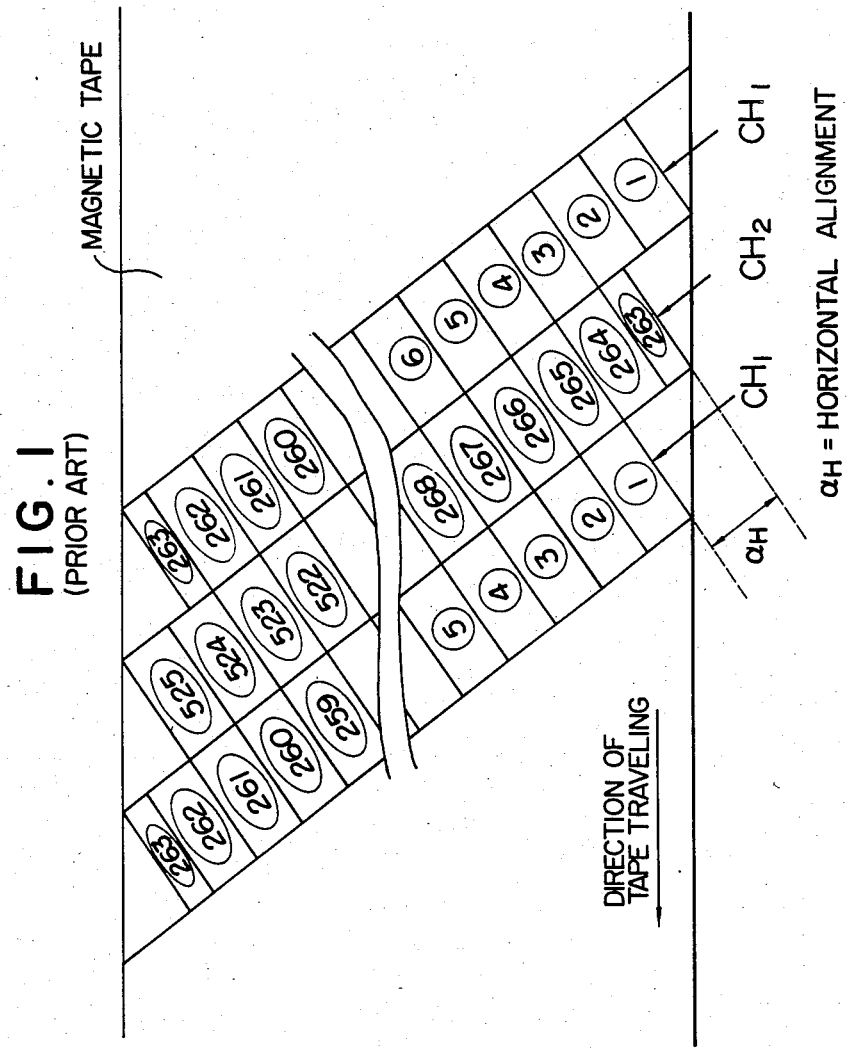
FIG. 1 is a diagrammatic view showing, by way of example, how a picture signal is recorded on a magnetic tape in a VTR, for illustrating the object of the present invention.
Figure 2:
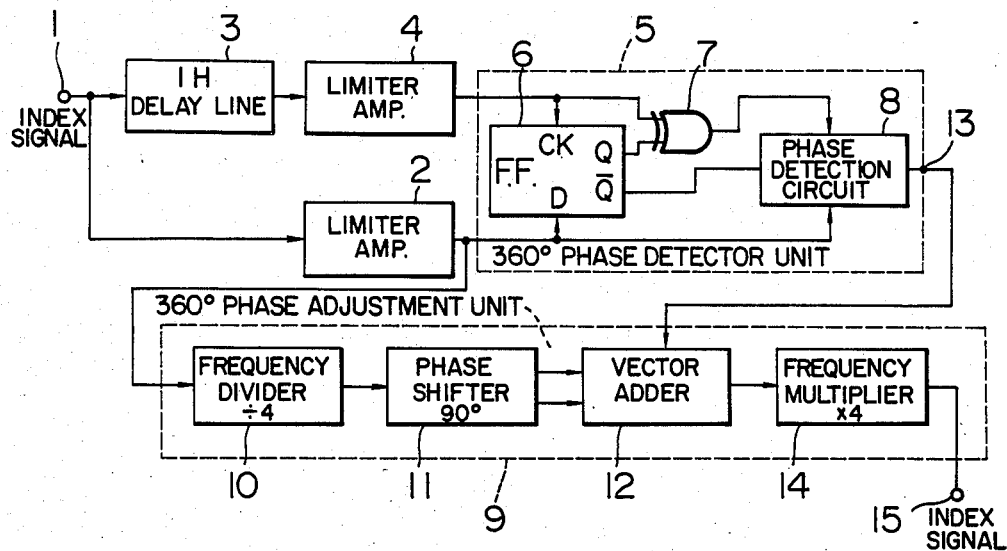
FIG. 2 is a block diagram showing the structure of one embodiment of the present invention.

The present invention will now be described in detail with reference to FIG. 2 which is a block diagram showing the structure of a preferred embodiment based on the fundamental idea of the present invention. Referring to FIG. 2, an index signal is applied to an index signal input terminal 1. The index signal from the input terminal 1 is applied, on one hand, directly to a limiter amplifier 2 and applied, on the other hand, to another limiter amplifier 4 through a 1H delay line 3, to be shaped into rectangular waveforms respectively. This 1H delay line 3 differs from the delay line having the delay time of (1H−Δτ) described already in the explanation of the prior art and is newly provided for attainment of the object of the present invention. This delay line 3 has a predetermined delay time. The delay time of this delay line 3 is selected to be exactly equal to the delay time of 1H or 63.556 μsec used for reproduction of a recorded signal in the NTSC system.

As described already, the index phosphor stripes are coated on the phosphor screen in a relation orthogonal with respect to the scanning lines, and, therefore, there is a sufficiently great vertical correlation between the vertically adjacent index signals. Thus, when a picture signal having one horizontal period H of 63.556 μsec which is the standard of the NTSC system is received, the output signals of the two limiter amplifiers 2 and 4 have the same phase. When, on the other hand, one horizontal period H differs from 63.556 μsec, there occurs a phase difference between the output signals of these two limiter amplifiers 2 and 4.

Figure 4C:
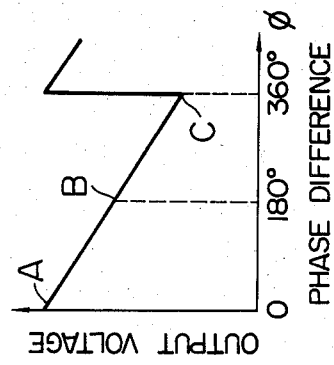
FIG. 4 shows phase detection characteristics of various phase detectors for illustrating the features of the present invention.
Figure 4B:
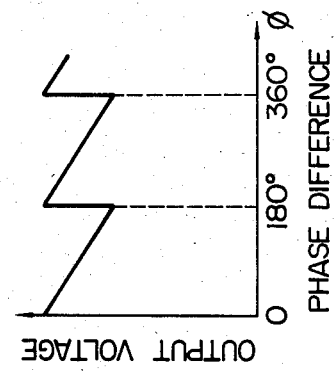
Figure 4A:
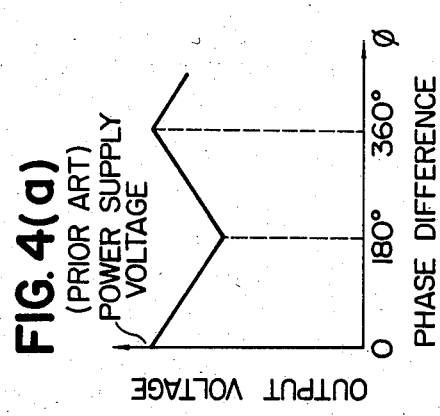

A 360° phase detector unit 5 enclosed by broken lines in FIG. 2 is used for detecting the phase difference between the output signals of the limiter amplifiers 2 and 4. This 360° phase detector unit 5 includes a flip-flop 6, an exclusive-OR gate circuit (abbreviated hereinafter as an E-OR gate circuit) 7 and a phase detection circuit 8. A conventional phase detection circuit cannot discriminate the phase difference of, for example, +270° from that of, for example, +90° between two input signals as shown in FIG. 4(a). Therefore, direct application of such a phase detection circuit to the present invention is not preferable in that a picture may be reproduced with a maximum hue error of 180°. In the present invention, it is required to detect the index-signal phase difference over a phase angle range of 360° and to control the phase over a phase angle range of 360° on the basis of the phase difference information.

Figure 3:
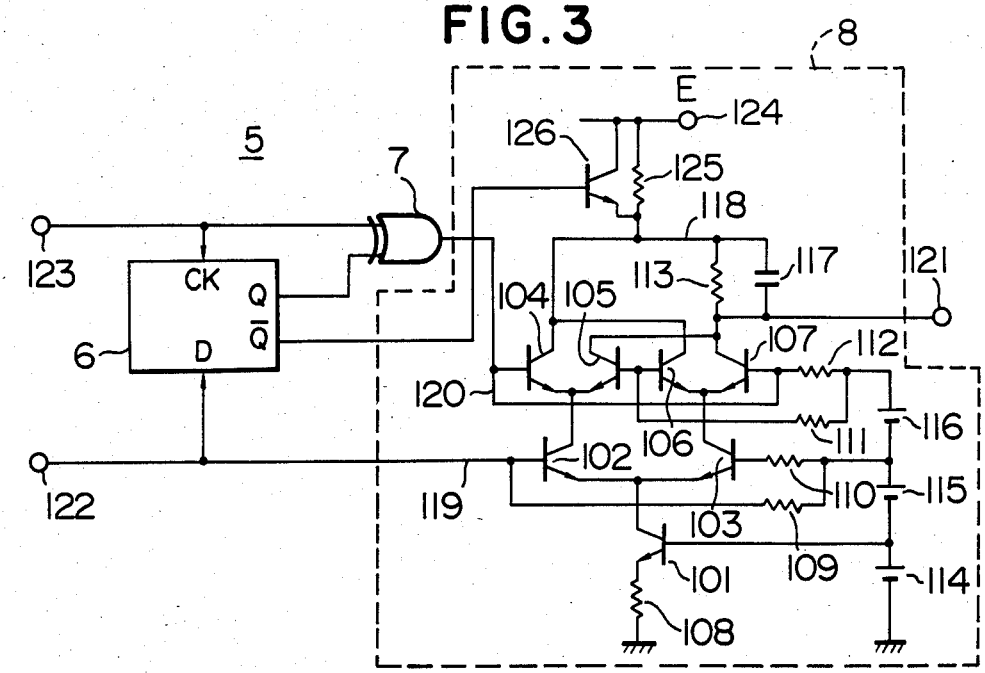
FIG. 3 is a circuit diagram showing in detail the structure of the 360° phase detection circuit shown in FIG. 2.

FIG. 3 shows in detail the structure of the 360° phase detector unit 5 shown in FIG. 2. Referring to FIG. 3, the combination of transistors 101 to 107, resistors 108 to 113, power sources 114 to 116 and a capacitor 117 constitutes a known 180° phase detection circuit in the form of a full-balanced differential circuit. Commonly, the voltage at a terminal 118 is fixed as a power source voltage, and signals applied to terminals 119 and 120 are multiplied to obtain at an output terminal 121 a mean DC voltage corresponding to the phase difference between the two input signals. FIG. 4(a) shows the phase detection characteristic of such a conventional phase detection circuit. It will be seen from the characteristic curve shown in FIG. 4(a) that there are two undistinguishable, input signal phase differences relative to an output voltage. Therefore, the present invention which requires phase detection over the phase angle range of 360° includes additional means as described below.

For the purpose of comparison between the phase of the output signal of the limiter amplifier 2 applied to a terminal 122 and that of the output signal of the limiter amplifier 4 applied to a terminal 123, the flip-flop 6 detects which of the output signals leads the other within a range of 180°. More precisely, an output signal of high or low level appears at the terminal Q of the flip-flop 6 depending on whether the level of the input signal applied to the terminal D is high or low at the rise time or leading edge of the input signal applied to the terminal CK of the flip-flop 6, and, on the basis of the output signal of high or low level appearing at the terminal Q of the flip-flop 6, whether or not the phase of the signal applied to the terminal 122 leads that of the signal applied to the terminal 123 can be decided. The output signal appearing at the terminal Q of the flip-flop 6 is applied to one of the input terminals of the E-OR gate circuit 7, while the signal applied to the terminal 123 is applied to the other input terminal of the E-OR gate circuit 7. In response to the application of these input signals, the E-OR gate circuit 7 acts as a buffer or an inverter for the signal applied from the terminal 123. That is, when the output signal of high level appears at the output terminal Q of the flip-flop 6, the E-OR gate circuit 7 acts as an inverter, while when the output signal of low level appears at the output terminal Q of the flip-flop 6, the E-OR gate circuit 7 acts as a buffer. Therefore, when the signal applied to the terminal 122 and the output signal of the E-OR gate circuit 7 are applied to the phase detection circuit 8, its phase detection characteristic is as shown in FIG. 4(b). It is apparent from the above description of the circuit structure that the phase difference $\phi$ in FIG. 4(b) indicates that the phase of the signal applied from the terminal 123 leads that of the signal applied from the terminal 122. It will be seen from comparison between FIG. 4(a) and FIG. 4(b) that the phase detection characteristic in the range of from 180° to 360° is inverted in FIG. 4(b) from that in FIG. 4(a). However, in this case too, there are two undistinguishable input signal phase differences relative to an output voltage.

Figure 5:
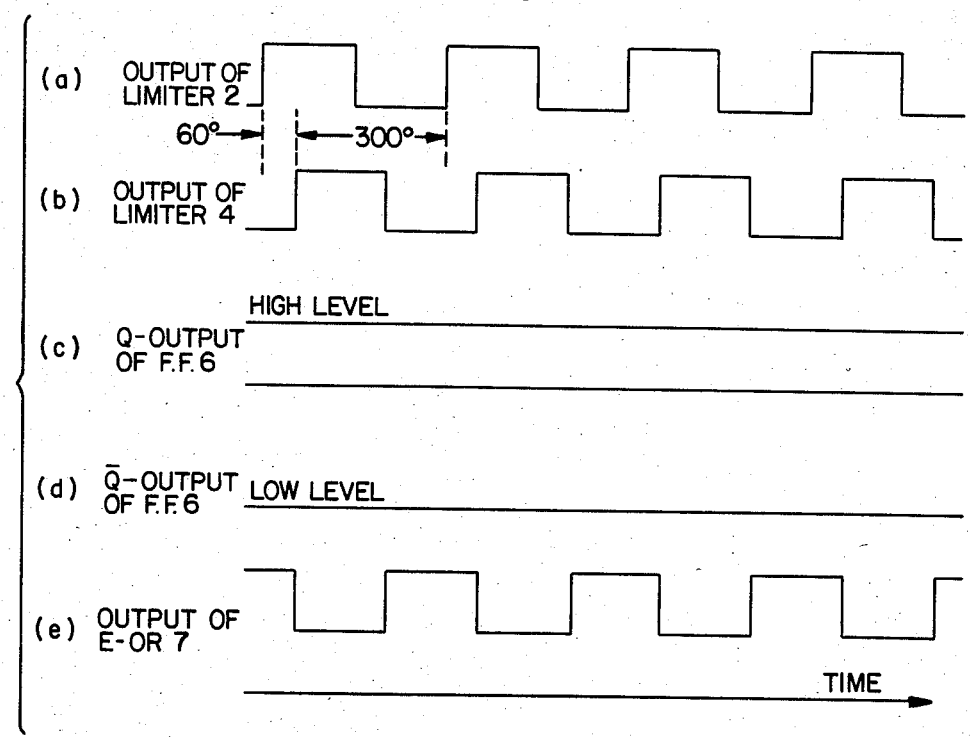
FIG. 5 shows waveforms (a)–(e) illustrating the outputs from the identified circuit elements of FIG. 3 for one phase relationship.

Therefore, the present invention further includes additional means as described below. Referring to FIG. 3, a parallel circuit of a resistor 125 and a transistor 126 as shown is connected between a power supply terminal 124 and the terminal 118 (which corresponds to the power supply terminal in the conventional phase detection circuit), and the base voltage of the transistor 126 is controlled by the voltage appearing at the other output terminal $\overline{Q}$ of the flip-flop 6. FIG. 4(c) shows the phase detection characteristic in such a case, and the phase detection characteristic shown in FIG. 4(c) will be described with reference to the circuit shown in FIG. 3. FIG. 5 shows a time chart of signals in the operation of the phase detector unit 5 where a horizontal frequency is shifted from the standard frequency so that the phase of the present index signal (FIG. 5(a)) is advanced by 60° (or delayed by 300°) as compared with the former (prior to 1H period) index signal (FIG. 5(b)). In FIG. 5, (a) shows the output signal of the limiter amplifier 2, (b) shows the output signal of the limiter amplifier 4, (c) shows the Q output of the flip-flop 6, (d) shows the $\overline{Q}$ output of flip flop 6, and (e) shows the output signal of exclusive-OR gate 7. Phase detection circuit 8 receives the signals (a) and (e) which are multiplied together, and outputs a DC voltage whose level corresponds to the phase difference between the signals (a) and (e) according to the characteristic curve shown in FIG. 4(c).

Figure 6:
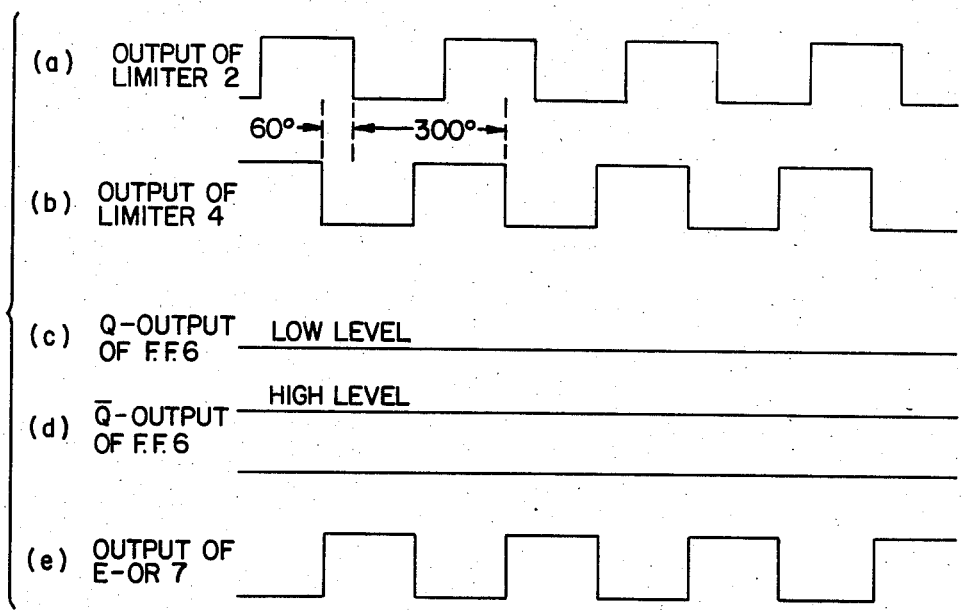
FIG. 6 shows waveforms (a)–(e) illustrating the outputs from the identified circuit elements of FIG. 3 for another phase relationship.

FIG. 6 shows a time chart of signals where a horizontal frequency is shifted from the standard frequency so that the phase of the present index signal (FIG. 6(a)) is delayed by 60° (or advanced by 300°) as compared with the former (prior to 1H period) index signal (FIG. 6(b)). In FIG. 6, (a) shows the output signal of the limiter amplifier 2, (b) shows the output signal of the limiter amplifier 4, (c) shows the Q output of flip-flop 6, (d) shows the $\overline{Q}$ output of flip-flop 6, and (e) shows the output signal of exclusive-OR gate 7. Phase detection circuit 8 receives the signals (a) and (e) which are multiplied together, and outputs a DC voltage whose level corresponds to the phase difference between the signals (a) and (e) according to the characteristic curve shown in FIG. 4(c).

In the characteristic curve portion where the phase difference $\phi$ is between 0° and 180° in FIG. 4(c), the leading edge of the signal applied to the terminal 123 exists within the low-level period of the signal applied to the terminal 122 in view of the circuit condition above described. Therefore, the output signal of low level appears at the output terminal Q of the flip-flop 6, and the E-OR gate circuit 7 acts as the buffer. Since, at this time, the other output terminal $\overline{Q}$ of the flip-flop 6 is in its high level which is equal to the power supply voltage E, the base voltage of the transistor 126 is maintained to be equal to the voltage E at the power supply terminal 124, and the transistor 126 is turned on. Consequently, the voltage at the terminal 118 is fixed at the level of $(E-V_{BE})$, where $V_{BE}$ is the base-emitter voltage of the transistor 126. When the phase of the signal applied to the terminal 123 is the same as that of the signal applied to the terminal 122 under the above state, no current flows through the resistor 113, and the voltage appearing at the output terminal 121 is also $(E-V_{BE})$. The point A in FIG. 4(c) represents this voltage value. Then, immediately before the point B in FIG. 4(c), the phase difference $\phi$ between the input signals applied to the terminals 122 and 123 is 180°, and the entire collector current of the transistor 101 flows through the resistor 113. In this case, the voltage at the output terminal 121 is given by $(E-V_{BE}-I_0 \cdot R_1)$, where $I_0$ represents the collector current of the transistor 101, and $R_1$ represents the resistance value of the resistor 113.

In the characteristic curve portion where the phase difference $\phi$ is between 180° and 360°, the output signal of high level appears at the output terminal Q of the flip-flop 6, and the E-OR gate 7 acts as the inverter. Consequently, at the phase difference $\phi=180°$, the phase difference between the signals applied to the terminals 119 and 120 is 0° although the phase difference between the signals applied to the terminals 122 and 123 is 180°.

Therefore, no current flows through the resistor 113 in the phase detection circuit 8. However, due to the fact that the low level appears at the other output terminal $\overline{Q}$ of the flip-flop 6 at this time, the transistor 126 is cut off and the collector current of the transistor 101 flows through the resistor 125. Consequently, the voltage at the terminal 118 is now given by $(E-I_0 \cdot R_2)$, where $R_2$ represents the resistance value of the resistor 125.

Thus, when the individual constants are so selected as to satisfy the equation $$E-V_{BE}-I_0 \cdot R_1 = E-I_0 \cdot R_2,$$

the phase detector output voltage appearing immediately after the point B can be made equal to that appearing immediately before the point B in FIG. 4(c). Since the sensitivity of phase detection is determined by the factors including the collector current of the transistor 101 and the resistance value of the resistor 113, the characteristic curve portion in the phase difference range between 180° and 360° has a gradient equal to that of the characteristic curve portion in the phase difference range between 0° and 180° in FIG. 4(c), and the relation between the output voltage and the phase difference $\phi$ in the phase difference range between 0° and 360° can therefore be expressed by a single straight line.

Thus, the phase detection characteristic shown in FIG. 4(c) differs from that of the prior art phase detection circuit in that the output voltage and the phase difference of from 0° to 360° have a 1:1 correspondence therebetween to enable the phase detection over the range of 360°.

The 360° phase adjusting means in the present invention is provided by elements enclosed by broken lines 9 in FIG. 2. Referring to FIG. 2, the frequency of the index signal which is the output from the limiter amplifier 2 is divided by the factor of, for example, four by a frequency divider 10, and the output signal of the frequency divider 10 is applied to a phase shifter 11 which generates two output signals having a phase difference of 90° therebetween. These two signals are applied to a vector adder 12, and the ratio of the levels of the two signals is controlled so that the phase can be adjusted within the range of ±45°. In the embodiment of the present invention shown in FIG. 2, the ratio of the signal levels is controlled by the output voltage of the 360° phase detector unit 5, that is, by the voltage appearing at the output terminal 121 shown in FIG. 3. The output signal of the vector adder 12 is then applied to a frequency multiplier 14 which multiplies the input frequency by the factor of four to provide the index signal which appears at an output terminal 15. In the manner above described, the vector adder 12 adjusts the phase within the range of ±45°, and the frequency of the output signal of the vector adder 12 is multiplied by the factor of four. Therefore, the amount of phase change of the index signal appearing at the output terminal 15 is ±180°, and the desired 360° phase adjustment can be achieved. In the vector adder 12 which is generally in the form of a differential amplifier circuit, the phase of the control voltage and that of the output signal have a 1:1 correspondence therebetween. Therefore, when the circuit constants are so selected that the phase control characteristic of the 360° phase adjustment unit 9 matches well with the phase detection characteristic of the 360° phase detection unit 5, the index-signal phase difference which is represented by the phase difference between the output signals of the limiter amplifiers 2 and 4 and which corresponds to the hue error in the reproduced color picture can be corrected over the range of 360°, and a color picture with the normal hue can be reproduced.

The above description is based on the assumption that the delay time of the 1H delay line 3 is exactly equal to 63.556 μsec which is one horizontal period in the NTSC system. However, the delay time of the delay line 3 is in no way limited to the value of 63.556 μsec provided that the horizontal raster size is stable, and, therefore, the period of the index signal is stable. For example, a delay line having a delay time of 63.0 μsec can be used. In such a case, the characteristic of the 360° phase detection unit 5 or of the 360° phase adjustment unit 9 may be previously shifted by the amount of index-signal phase change corresponding to the value of 0.556 μsec, since the amount of index-signal phase change corresponding to the value of 0.556 μsec is already known. According to the same idea, a delay line (not shown) providing a delay time of $(1H - \Delta\tau)$, where 1H represents one horizontal period and $\Delta\tau$ represents the delay time of several μsec in the index signal processing circuit as described with reference to the prior art apparatus, may be used as the delay line 3 shown in FIG. 2. In such a case, the delay line 3 provided according to the present invention and shown in FIG. 2 for dealing with a hue error appearing in a reproduced picture due to a variation of the horizontal scanning period of a received picture signal can be used to function also as the delay line provided for dealing with the problem of lack of full uniformity of a reproduced hue due to a horizontal linear distortion. Thus, in FIG. 2, the output signal of the limiter amplifier 4 may be used as the input signal to the 360° phase adjustment unit 9, instead of the output signal of the limiter amplifier 2.

It is apparent that the present invention is in no way limited to the specific embodiment shown in FIGS. 2 and 3, and various changes and modifications providing similar effects may be made therein without departing from the scope of appended claims.

Figure 7:
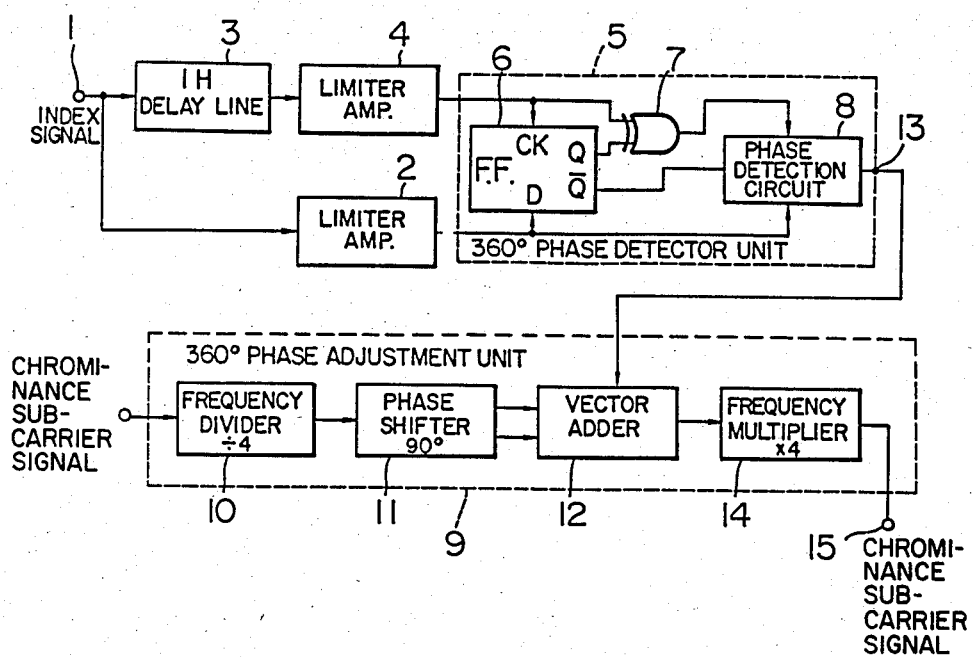
FIG. 7 is a block diagram showing the structure of another embodiment in accordance with the present invention.
Figure 8:
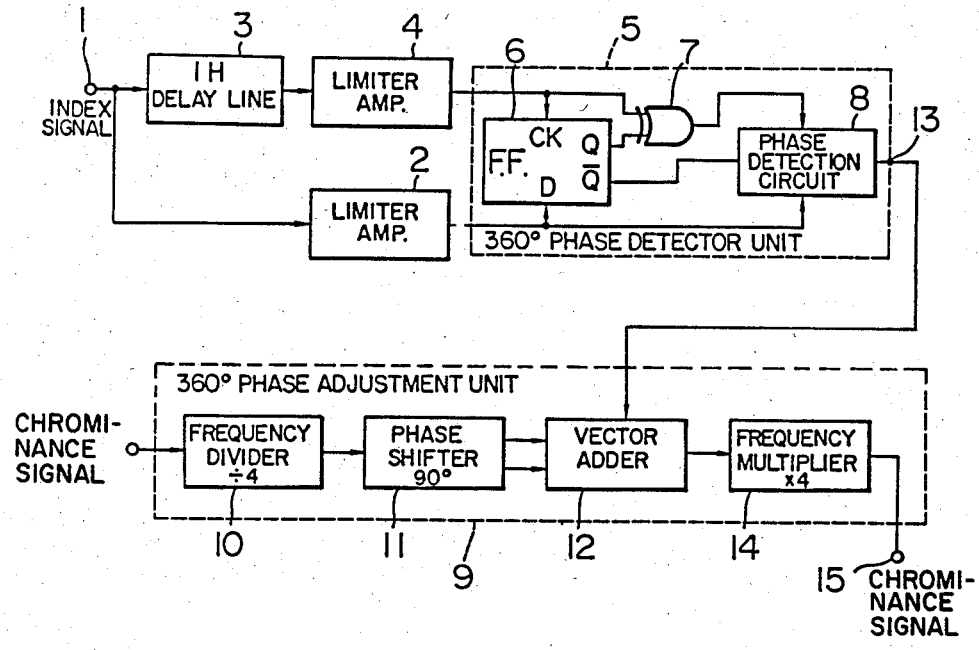
FIG. 8 is a block diagram showing the structure of a further embodiment in accordance with the present invention.

In the embodiment of the present invention described hereinbefore, the phase of the index signal is adjusted and controlled over the range of 360° for reproduction of a picture with a normal hue when a picture signal having horizontal scanning period different from the standard one of the NTSC system is received. However, as is well known in the field of index type color picture reproduction, the hue of a reproduced picture can be changed by controlling the phase of any one of the index signal as illustrated in FIG. 7, chrominance subcarrier signal and chrominance signal as illustrated in FIG. 8. Therefore, any one of these signals may be applied as the input signal to the 360° phase adjustment unit 9 shown in FIG. 2.

It will be understood from the foregoing detailed description of the present invention that, in an index type color picture reproducing apparatus including a delay line having a delay time of $(1H - \Delta\tau)$ for ensuring full uniformity of the hue of a reproduced picture, a color picture with the normal hue can be reproduced even when a picture signal received by the apparatus has a horizontal scanning period different from the standard one of the NTSC system.

We claim:

1. An index type color picture reproducing circuit comprising:

index signal detecting means for simultaneously generating as its output signals, a first index signal received at the present time and a second index signal received at the time earlier substantially by one standard horizontal scanning period than the former;

phase detecting means for detecting the phase difference between the first and second index signals simultaneously applied thereto over a phase angle range of 360°, thereby generating an output signal indicative of the phase difference between said index signals; and phase adjusting means receiving one of the index signal, a chrominance subcarrier signal and a chrominance signal as its input signal for changing the phase of said input signal over a phase angle range of 360° depending on the output signal of said phase detecting means, thereby generating a signal for enabling a color picture with normal hue to be reproduced on an index type picture tube even when a picture signal received has a horizontal scanning frequency different from a standard horizontal scanning frequency.

2. An index type color picture reproducing circuit as claimed in claim 1, wherein said phase detecting means includes phase converting means receiving as its input signals said first and second index signals generated by said index signal detecting means for generating as its output signal one of said first and second index signals while inverting or without inverting the same depending on whether the level of the other of said first and second index signals is high or low respectively at the leading edge of said one of said first and second index signals, and a phase detection circuit receiving as its input signals said output signal of said phase converting means and the other of said first and second index signals for generating an output voltage corresponding to the phase difference between the input signals over a phase angle range of 360°.

3. An index type color picture reproducing circuit as claimed in claim 1, wherein said phase adjusting means includes a frequency divider receiving as its input signal one of said index signals generated from said index signal detecting means for dividing the frequency of the input signal by a factor of n, wherein n is a predetermined value, a phase shifter receiving as its input signal said frequency-divided index signal from said frequency divider for generating two output signals having a phase difference of a predetermined angle therebetween, a vector adder for producing an output signal by adding the two output signals from said phase shifter while controlling a ratio of the levels of the two output signals depending on the output voltage of said phase detecting means, and a frequency multiplier multiplying the frequency of the output signal of said vector adder by the factor of n for restoring it to the original frequency of said index signal before being frequency-divided.

* * * * *